United States Patent
Bao et al.

(10) Patent No.: US 11,640,558 B2
(45) Date of Patent: May 2, 2023

(54) UNBALANCED SAMPLE CLASSIFICATION METHOD AND APPARATUS

(71) Applicants: Shenzhen Academy of Inspection and Quarantine, Shenzhen (CN); Shenzhen Customs Information Center, Shenzhen (CN); Shenzhen Customs Animal and Plant Inspection and Quarantine Technology Center, Shenzhen (CN)

(72) Inventors: Xianyu Bao, Shenzhen (CN); Yina Cai, Shenzhen (CN); Zhouxi Ruan, Shenzhen (CN); Yun Guo, Shenzhen (CN); Shaojing Wu, Shenzhen (CN); Tikang Lu, Shenzhen (CN); Zhinan Chen, Shenzhen (CN)

(73) Assignees: SHENZHEN ACADEMY OF INSPECTION AND QUARANTINE, Shenzhen (CN); SHENZHEN CUSTOMS INFORMATION CENTER, Shenzhen (CN); SHENZHEN CUSTOMS ANIMAL AND PLANT INSPECTION AND QUARANTINE TECHNOLOGY CENTER, Shenzhen (CN)

( * ) Notice: Subject to any disclaimer, the term of this patent is extended or adjusted under 35 U.S.C. 154(b) by 338 days.

(21) Appl. No.: 17/009,730

(22) Filed: Sep. 1, 2020

(65) Prior Publication Data
US 2022/0019938 A1 Jan. 20, 2022

(30) Foreign Application Priority Data
Jul. 20, 2020 (CN) .......................... 202010698044.1

(51) Int. Cl.
*G06N 20/00* (2019.01)
*G06K 9/62* (2022.01)
*G06N 3/08* (2006.01)

(52) U.S. Cl.
CPC ........... *G06N 20/00* (2019.01); *G06K 9/6231* (2013.01); *G06K 9/6256* (2013.01); *G06K 9/6268* (2013.01); *G06N 3/08* (2013.01)

(58) Field of Classification Search
None
See application file for complete search history.

(56) References Cited

U.S. PATENT DOCUMENTS

| 2017/0132516 A1* | 5/2017 | Zhang | G06Q 30/0202 |
| 2019/0102277 A1* | 4/2019 | Walenstein | G06N 20/00 |
| 2021/0158078 A1* | 5/2021 | Yu | G06K 9/628 |

OTHER PUBLICATIONS

Brownlee, "Tour of Data Sampling Methods for Imbalanced Classification," Jan. 24, 2020, https://machinelearningmastery.com/data-sampling-methods-for-imbalanced-classification/.*

* cited by examiner

Primary Examiner — Ryan Barrett

(57) ABSTRACT

The present disclosure provides an unbalanced sample classification method and an unbalanced sample classification apparatus. The method includes: obtaining unbalanced sample data; calculating a sample contribution rate based on the sample data and the characteristic data; filtering out a part of the sample data within a preset sample contribution threshold according to the sample contribution rate to determine as target sample data; and inputting the target sample data into a sample classification model to calculate a sample classification result through a classification algorithm. By using two variables of the characteristic value contribution rate and the characteristic contribution rate, the characteristics and samples with low contribution rate for classification are eliminated to effectively reducing the processing of unbalanced sample data, and a machine learning classification algorithm can be used on this basis to adopt the effective characteristics or samples to achieve efficient classification.

12 Claims, 4 Drawing Sheets

UNBALANCED SAMPLE CLASSIFICATION METHOD AND APPARATUS

CROSS REFERENCE TO RELATED APPLICATIONS

The present disclosure claims priority to Chinese Patent Application No. 202010698044.1, filed Jul. 20, 2020, which is hereby incorporated by reference herein as if set forth in its entirety.

BACKGROUND

1. Technical Field

The present disclosure relates to data processing technology, and particularly to an unbalanced sample classification method and an unbalanced sample classification apparatus.

2. Description of Related Art

In real life, it's often to encounter various scenarios need classifications. For example, to identify high-quality customers among many loan applicants, to judge the level of auto insurance based on the conditions of a vehicle and its owner by insurance companies, to grade foods according to food information samples, and the like. In the case that the numbers of various samples for classifications are relatively balanced, it will be easy to get more accurate results. However, in the case of a very large gap in the proportions of various samples, for example, when the ratio between the numbers of the samples reaches 1:100, which will be referred to as sample imbalance, and there will be a great challenge to get a more ideal classification effect.

At present, to deal with the issues of sample imbalance, data sampling processing and algorithm adjustments are mainly used. In terms of data sampling processing, in the paper "Oversampling Algorithms for Unbalanced Data Sets", an improved oversampling algorithm using clustering algorithm that is referred to as CSMOTE is proposed, which uses the cluster center of minority classes and the samples in the corresponding clusters to perform linear interpolation so as to synthesize samples, and to filter the samples participating in the synthesis so as to reduce the possibility of the noisy samples participating in the synthesis. In terms of algorithm adjustment, in the paper "Characteristic Selection Method Based on Unbalanced Data Class Distribution Learning", a characteristic selection method based on unbalanced data class distribution learning is proposed. First, the loss function of the method is transformed from cumulative relative entropy to continued multiplication relative entropy so as to introduce the evaluation of unbalanced data into the loss function. The new loss function is transformed and the derivative of the gradient is calculated to obtain the gradient direction of the declining loss function, and the loss function is converged through the variable step gradient descent method. Finally, threshold control is performed through the learned class distribution so as to filter the characteristics to achieve the purpose of characteristic selection.

However, when the methods in the prior art are applied to the classification of unbalanced samples, there are problems such as complex calculation and low classification accuracy.

SUMMARY

In view of the above-mentioned problems, the present disclosure provides an unbalanced sample classification method and a corresponding unbalanced sample classification apparatus to overcome the problems or at least partially solve the problems.

In order to solve the above-mentioned problems, an embodiment of the present disclosure provides an unbalanced sample classification method, including steps of:

obtaining unbalanced sample data, where the unbalanced sample data includes sample data and characteristic data;

calculating a sample contribution rate based on the sample data and the characteristic data;

filtering out a part of the sample data within a preset sample contribution threshold according to the sample contribution rate to determine as target sample data; and inputting the target sample data into a sample classification model to calculate a sample classification result through an optimized classification algorithm.

In one embodiment, the sample contribution rate includes a characteristic value contribution rate, and the step of calculating the sample contribution rate based on the sample data and the characteristic data includes:

calculating the characteristic value contribution rate based on the sample data $a_i$ and the characteristic data $b_j$, where the characteristic value contribution rate of the value corresponding to the characteristic j in the i-th sample $a_{ij}$ with respect to a classification of the samples in the unbalanced sample data $c_k = \max(N_{ck}/N_{jk}, (1-N)/N_{jk})$, where k=1, 2, . . . , and T, N is the total number of the samples, i=1, 2, . . . , and N, $N_{ck}$ is the number of the samples with the same values with the characteristic j in the i-th sample $a_{ij}$ in the characteristic data $b_j$ within the classification $c_k$, and $N_{jk}$ is the total number of the samples with the same value with the characteristic j in the i-th sample $a_{ij}$ in the characteristic data $b_j$.

In one embodiment, the sample contribution rate further includes a characteristic contribution rate, and after the step of calculating the characteristic value contribution rate based on the sample data $a_i$ and the characteristic data $b_j$ further includes step of:

calculating the characteristic contribution rate based on the sample data $a_i$, the characteristic data $b_j$, and the characteristic value contribution rate of the value corresponding to the characteristic j in the i-th sample $a_{ij}$ respect to the classification $c_k$, wherein the characteristic contribution rate of the characteristic data $b_j$ with respect to the classification $c_k = \Sigma$(the characteristic value contribution rate*MAX($N_{ck}$, 1−$N_{ck}$))/N.

In one embodiment, the step of filtering out the part of the sample data within the preset sample contribution threshold according to the sample contribution rate to determine as the target sample data includes:

retaining one of the characteristic data with the characteristic contribution rate of 1 and removing the remaining characteristic data with the characteristic contribution rate of 1, in response to the number of characteristics data with the characteristic contribution rate of 1 in the unbalanced sample data is greater than or equal to 2.

In one embodiment, the step of filtering out the part of the sample data within the preset sample contribution threshold according to the sample contribution rate to determine as the target sample data further includes:

removing the sample data with the characteristic value contribution rate of less than or equal to 0.5 in the unbalanced sample data, if there are a plurality of the above-mentioned sample data.

In one embodiment, after the step of inputting the target sample data into the sample classification model to calculate the sample classification result through the optimized classification algorithm further includes step of:

training a to-be-trained model created based on the optimized classification algorithm using historical unbalanced sample data.

In one embodiment, the step of training the to-be-trained model created based on the optimized classification algorithm using historical unbalanced sample data includes:

obtaining the sample data for establishing a correspondence between the historical unbalanced sample data and the sample classification result; and analyzing an influence of the characteristic data and the sample data on the sample classification results based on the characteristic data and the sample data in the historical unbalanced sample data, and determining a model structure and one or more model parameters of the sample classification model according to the influence.

Moreover, an embodiment of the present disclosure provides an unbalanced sample classification apparatus, including:

a data obtaining module configured to obtain unbalanced sample data, where the unbalanced sample data includes sample data and characteristic data;

a data analyzing module configured to calculate a sample contribution rate based on the sample data and the characteristic data;

a data filtering module configured to filter out a part of the sample data within a preset sample contribution threshold according to the sample contribution rate to determine as target sample data; and a sample classifying module configured to input the target sample data into a sample classification model to calculate a sample classification result through an optimized classification algorithm.

In comparison with the prior art, the embodiments of the present disclosure has the following advantages: by using two variables of the characteristic value contribution rate and the characteristic contribution rate, the characteristics and samples with low contribution rate for classification are eliminated to effectively reducing the processing of unbalanced sample data, and a machine learning classification algorithm is used on this basis to adopt the effective characteristics or samples to achieve efficient classification, so as to improve the efficiency of classification while ensuring the quality of classification.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the above-mentioned objectives, features and advantages of the present disclosure more obvious and understandable, the present disclosure will be further described in detail below in conjunction with the drawings and the embodiments.

One of the core concepts of the embodiments of the present disclosure is to provide an unbalanced sample classification method and an unbalanced sample classification apparatus. In which, the unbalanced sample classification method includes: obtaining unbalanced sample data, where the unbalanced sample data comprises sample data and characteristic data; calculating a sample contribution rate based on the sample data and the characteristic data; filtering out a part of the sample data within a preset sample contribution threshold according to the sample contribution rate to determine as target sample data; and inputting the target sample data into a sample classification model to calculate a sample classification result through an optimized classification algorithm. By using two variables of the characteristic value contribution rate and the characteristic contribution rate, the characteristics and samples with low contribution rate for classification are eliminated to effectively reducing the processing of unbalanced sample data, and a machine learning classification algorithm is used on this basis to adopt the effective characteristics or samples to achieve efficient classification, so as to improve the efficiency of classification while ensuring the quality of classification.

Figure 1:
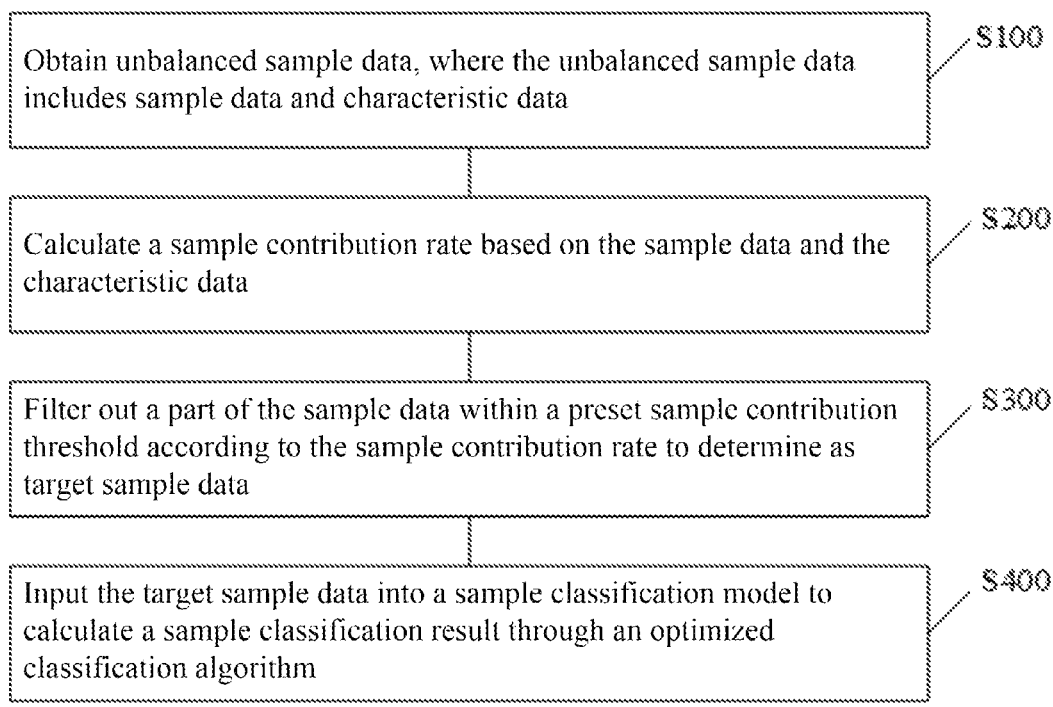
FIG. 1 is a flow chart of an embodiment of an unbalanced sample classification method according to the present disclosure.
Figure 2:
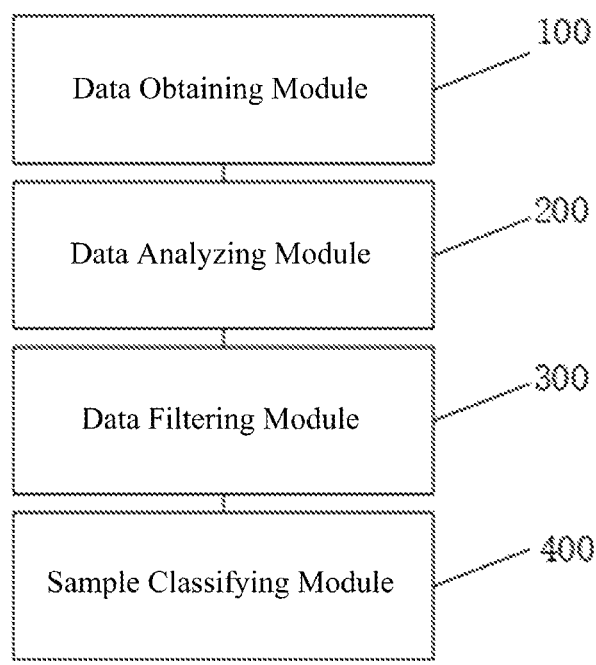
FIG. 2 is a flow chart of an example of the execution of the unbalanced sample classification method of FIG. 1.

FIG. 1 is a flow chart of an embodiment of an unbalanced sample classification method according to the present disclosure; and FIG. 2 is a flow chart of an example of the execution of the unbalanced sample classification method of FIG. 1. In this embodiment, an unbalanced sample classification method is provided. The method is a computer-implemented method executable for a processor. In one embodiment, the method may be implemented through and applied to an unbalanced sample classification apparatus shown in FIG. 3 or a computing device shown in FIG. 4. As shown in FIG. 1 and FIG. 2, the method includes the following steps.

S100: obtaining unbalanced sample data, where the unbalanced sample data includes sample data and characteristic data;

S200: calculating a sample contribution rate based on the sample data and the characteristic data;

S300: filtering out a part of the sample data within a preset sample contribution threshold according to the sample contribution rate to determine as target sample data; and S400: inputting the target sample data into a sample classification model to calculate a sample classification result through an optimized classification algorithm.

In step S100, the unbalanced sample data is obtained from, for example, a classification system. The unbalanced sample data is obtained in response to, for example, a request for classification which is received from the classification system. The classification system can be a computer system (e.g., a desktop computer, a server, or a mobile phone) which can be the unbalanced sample classification apparatus shown in FIG. 3 (or the computing device shown in FIG. 4) itself, or be coupled to the unbalanced sample classification apparatus shown in FIG. 3 (or the computing device shown in FIG. 4) through, for example, a system bus, or can also be independent from the unbalanced sample classification apparatus shown in FIG. 3 (or the computing device shown in FIG. 4) and coupled thereto through, for example, a network such as the Internet. In real life, it's often to encounter various scenarios need classifications. For example, to identify high-quality customers among many loan applicants, to judge the level of auto insurance based on the conditions of a vehicle and its owner by insurance companies. In the case that the numbers of various samples for classifications are relatively balanced, it will be easy to get more accurate results. However, in some cases, there is a very large gap in the proportions of various samples, and the ratio between the numbers of the samples reaches 1:100 or more, which will be referred to as sample imbalance, and a set of data including the data of the samples largely differ in their numbers is the unbalanced sample data. In this case, there will be a great challenge to get a more ideal classification effect. In which, the unbalanced sample data in this embodiment is not limited to any of the foregoing samples, and the unbalanced sample data includes the sample data and the characteristic data. In this embodiment, the unbalanced sample data of a to-be-classified object such as a data set of iris or the above-mentioned vehicle insurance is obtained from, for example, a preset database, where the sample data and the characteristic data can be text data. Taking the data set of iris used as the to-be-classified object as an example, the sample data includes petal data and calyx data, and the characteristic data includes petal length data, petal width data, calyx length data, and calyx width data. That is, the sample data is a first-level classification of the data set, and the characteristic data is a sub-category under the first-level classification of the data set.

In step S200, the sample contribution rate is calculated based on the sample data and the characteristic data. By using two variables of the characteristic value contribution rate and the characteristic contribution rate, the characteristics and samples with low contribution rate for classification are eliminated to effectively reducing the processing time of unbalanced sample data, so as to improve the efficiency of the classification of the samples.

In step S300, the part of the sample data within the preset sample contribution threshold is filtered out according to the sample contribution rate to determine as the target sample data. The characteristics with little contribution rate or similar contribution from the unbalanced sample data, which can effectively improve the efficiency of the processing and classification of the sample data. The large the characteristic value contribution rate, the better the classification effect for the value corresponding to the characteristic. The larger the characteristic contribution rate, the better the classification effect of the characteristic, and vice versa.

In step S400, the target sample data is inputted into the sample classification model to calculate the sample classification result through the optimized classification algorithm. By using two variables of the characteristic value contribution rate and the characteristic contribution rate, the characteristics and samples with low contribution rate for classification are eliminated to effectively reducing the processing of unbalanced sample data, and a machine learning classification algorithm is used on this basis to adopt the effective characteristics or samples to achieve efficient classification, so as to improve the efficiency of classification while ensuring the quality of classification. In one embodiment, step S400 can include: obtaining data for creating a correspondence between the target sample data and the sample classification result; analyzing (characteristics and laws of) the target sample data, and determining a model structure and model parameters of the sample classification model according to the analyzation; and using the data to train and test the model structure and the model parameters, and determining the correspondence between the target sample data and the sample classification result. The sample classification result is provided to the classification system by, for example, transmitting a response for the request for classification which includes the sample classification result to the classification system. In this embodiment, the optimized classification algorithm such as a machine learning classification algorithm is used. In other embodiments, other classification algorithm can be used.

In this embodiment, the sample contribution rate includes a characteristic value contribution rate, and step S200 of calculating the sample contribution rate based on the sample data and the characteristic data includes:

calculating the characteristic value contribution rate based on the sample data $a_i$ and the characteristic data $b_j$, where the characteristic value contribution rate of the value corresponding to the characteristic j in the i-th sample $a_{ij}$ with respect to a classification of the samples in the unbalanced sample data $c_k = \max(N_{ck}/N_{jk}, (1-N)/N_{jk})$. In which, $k=1, 2, \ldots,$ and T, N is the total number of the samples, $i=1, 2, \ldots,$ and N, $N_{ck}$ is the number of the samples with the same values with the characteristic j in the i-th sample $a_{ij}$ in the characteristic data $b_j$ within the classification $c_k$, and $N_{jk}$ is the total number of the samples with the same value with the characteristic j in the i-th sample $a_{ij}$ in the characteristic data $b_j$.

In this embodiment, the sample contribution rate further includes a characteristic contribution rate, and after step S200 of calculating the characteristic value contribution rate based on the sample data $a_i$ and the characteristic data $b_j$ further includes step of:

calculating the characteristic contribution rate based on the sample data $a_i$, the characteristic data $b_j$, and the characteristic value contribution rate of the value corresponding to the characteristic j in the i-th sample $a_{ij}$ with respect to the classification $c_k$, where the characteristic contribution rate of the characteristic data $b_j$ with respect to the classification $c_k = \Sigma$(the characteristic value contribution rate*MAX($N_{ck}$, $1-N_{ck}$))/N.

In one example, taking the classification of a iris data set as an example, which includes steps of:

(1) calculating the characteristic value contribution rate of each value and each characteristic contribution rate in each characteristic.

The characteristic contribution rate is considered first. After calculation, it is found that the contribution rates of the two values of the characteristics of petal length and petal width contribute to the Irissetosa-type iris are both 100%. It represents that the Irissetosa-type irises can be completely distinguished by merely adopting any one of the two characteristics. In this case, by using the petal length or the petal width as the unique value of characteristic and adopting the decision tree algorithm, it can ensure the classification accuracy of the Irissetosa-type iris to be 100%, which is equivalent to the effect when adopting 4 characteristic values, while the characteristic selection range is much smaller and the calculation amount is also much less.

(2) continuing to calculate the above-mentioned characteristic value contribution rate and characteristic contribution rate after removing the samples of the Irissetosa-type according to the results of step (1).

At this time, the number of the samples is reduced from 150 to 100, and the multi-dimensional sample data classification is also converted into a two-dimensional sample data classification. Continue to calculate the characteristic value contribution rate of each value and each characteristic contribution rate in each characteristic, and the characteristic contribution rates of the petal width, the petal length, the calyx width, and the calyx length are 89.29%, 88.30%, 44.12%, and 60.48%, respectively. It can be seen that the characteristic contribution rate of the calyx width is the lowest. If there are many characteristics, it can consider to reduce the priority of the characteristic to be input to the algorithm.

(3) eliminating a part of the samples based on the characteristic values contribution rate.

According to the definition of the characteristic value contribution rate, it can be known that the value is between 0.5 and 1. When the value is 1, the types can be completely distinguished through the value in the characteristic. When the value is 0.5, the types cannot be completely distinguished through the value in the characteristic. After calculation, it is found that in the samples with the petal width, the petal length, the calyx width, and the calyx length of 1.7, 4.5, 2.5, and 4.9, respectively, the characteristic value contribution rates of the petal width, the petal length, and the calyx length are all 50%, hence the discrimination is low. Therefore, the sample is eliminated from the calculation of the algorithm. In the other 13 samples, there are two of them have the characteristic value contribution rate of 50%, and they can also be considered to be eliminated when there are many samples.

The results of the above-mentioned example show that due to the small data amount of iris, the multi-dimensional sample data classification is converted into the two-dimensional sample data classification. When the classification process of the present disclosure is not used, the KNN algorithm is used to predict, where 4 characteristics are used and the classification accuracy is above 93%. When using the above-mentioned method of the present disclosure, if the classifications include the Irissetosa-type iris, regardless of the number of the samples, by using any one of the petal length and the petal width, the classification accuracy of 100% can be guaranteed. If the classifications do not include the Irissetosa-type iris, by using the two characteristics of the petal length and the petal width, the classification accuracy can over 89%, and the classification accuracy can be between 90% and 94% if a part of the samples with poor contribution rate are eliminated.

In this embodiment, the unbalanced sample classification method organically combines the characteristic selection and the sample selection with the calculation of the classification algorithm through the newly defined characteristic value contribution rate and characteristic contribution rate. By introducing as few characteristics as possible, the part of the samples that do not have distinguish significance are eliminated to improve the classification efficiency.

In another example, the above-mentioned unbalanced sample classification method can also be applied to the process of food information classification. The food safety traceability refers to, in order to ensure food quality and safety, the producers, the processors, and the distributors record the information may affect food quality and safety in detail so as to store and disclose during the production and sales of foods to consumers. After the foods are produced or distributed, the information of the entire food supply process can be reproduced, so as to achieve "source traceability, flow direction traceability, and can-be-monitored process and can-be-recalled products". However, traceability technology alone cannot solve food safety problems. Food risk information identification, monitoring and early warning of possible hazards throughout the food supply chain are the goals and directions that are commonly concerned by food industry companies and governments of all countries. The existing food grading systems mainly focus on traceability information collection, information recording, and information query services centered on the distribution stage, which often leads to problems such as information islands and stage information fracture because of the imbalance in information collection. Therefore, by using the above-mentioned unbalanced sample classification method to process unbalanced food information samples, the characteristics and samples with low characteristic contribution rates in the food information by using the two variables of the characteristic value contribution rate and the characteristic contribution rates of the information sample of the food and its characteristics, which can effectively reduce the processing of unbalanced food sample data. On this basis, a machine learning classification algorithm is used to adopt the effective characteristics or samples to achieve efficient classification for food risk traceability information, so as to improve the efficiency of classification while ensuring the quality of classification.

In this embodiment, step S300 of filtering out the part of the sample data within the preset sample contribution threshold according to the sample contribution rate to determine as the target sample data includes:

retaining one of the characteristic data with the characteristic contribution rate of 1 and removing the remaining characteristic data with the characteristic contribution rate of 1, in response to the number of characteristics data with the characteristic contribution rate of 1 in the unbalanced sample data is greater than or equal to 2.

In this embodiment, step S300 of filtering out the part of the sample data within the preset sample contribution threshold according to the sample contribution rate to determine as the target sample data further includes:

removing the sample data with the characteristic value contribution rate of less than or equal to 0.5 in the unbalanced sample data, if there are a plurality of the above-mentioned sample data.

In this embodiment, after step S400 of inputting the target sample data into the sample classification model to calculate the sample classification result through the optimized classification algorithm further includes step of:

training a to-be-trained model created based on the optimized classification algorithm using historical unbalanced sample data.

In this embodiment, the step of training the to-be-trained model created based on the optimized classification algorithm using historical unbalanced sample data includes:

obtaining the sample data for establishing a correspondence between the historical unbalanced sample data and the sample classification result; and analyzing an influence of the characteristic data and the sample data on the sample classification results based on the characteristic data and the sample data in the historical unbalanced sample data, and determining a model structure and one or more model parameters of the sample classification model according to the influence.

It should be noted that, in regard to the method embodiments, for the sake of simple description, they are all expressed as a series of action combinations, but those skilled in the art should know that the embodiments are not limited by the described sequence of actions, because according to the embodiments, certain steps may be executed in other order or simultaneously. Moreover, those skilled in the art should also know that the embodiments described in the specification are all examples, and the actions involved are not necessarily required by the embodiments.

Figure 3:
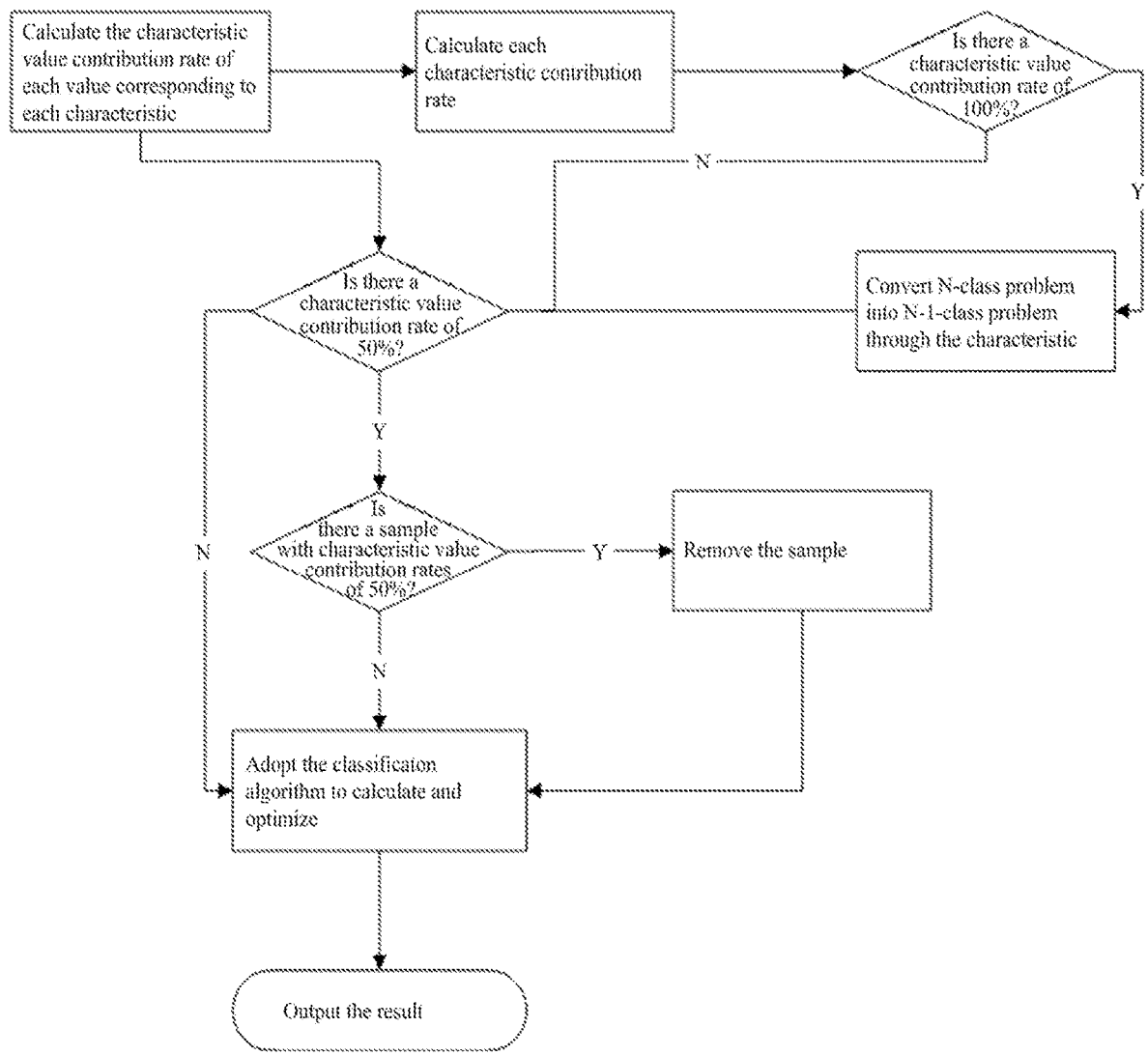
FIG. 3 is a schematic block diagram of an embodiment of an unbalanced sample classification apparatus according to the present disclosure.

FIG. 3 is a schematic block diagram of an embodiment of an unbalanced sample classification apparatus according to the present disclosure. In this embodiment, an unbalanced sample classification apparatus is provided. In one embodiment, the apparatus may be applied to a computing device shown in FIG. 4. As shown in FIG. 3, the apparatus includes:

a data obtaining module 100 configured to obtain unbalanced sample data, where the unbalanced sample data includes sample data and characteristic data;

a data analyzing module 200 configured to calculate a sample contribution rate based on the sample data and the characteristic data;

a data filtering module 300 configured to filter out a part of the sample data within a preset sample contribution threshold according to the sample contribution rate to determine as target sample data; and a sample classifying module 400 configured to input the target sample data into a sample classification model to calculate a sample classification result through an optimized classification algorithm.

In this embodiment, the sample contribution rate includes a characteristic value contribution rate, and the data analyzing module 200 includes:

a first data analysis unit configured to calculate the characteristic value contribution rate of the value corresponding to the characteristic j in the i-th sample $a_{ij}$ with respect to $c_k$ based on the sample data $a_i$ and the characteristic data $b_j$ through the equation of: the characteristic value contribution rate of $a_{ij}$ with respect to $c_k$=max($N_{ck}/N_{jk}$,(1−N)/$N_{jk}$); where $a_{ij}$ is the value corresponding to the characteristic j in the i-th sample, and $c_k$ represents a classification of the samples in the unbalanced sample data, k=1, 2, . . . , and T, the total number of the samples is N, and i=1, 2, . . . , and N; where $N_{ck}$ is the number of the samples with the same values with the characteristic j in the i-th sample $a_{ij}$ in the characteristic data/within the classification $c_k$, and $N_{jk}$ is the total number of the samples with the same value with the characteristic j in the i-th sample $a_{ij}$ in the characteristic data $b_j$.

In this embodiment, the sample contribution rate further includes a characteristic contribution rate, and the data analyzing module 200 further includes:

a second data analysis unit configured to calculate the characteristic contribution rate based on the sample data $a_i$, the characteristic data $b_j$, and the characteristic value contribution rate of the value corresponding to the characteristic j in the i-th sample $a_{ij}$ with respect to the classification $c_k$, where the characteristic contribution rate of the characteristic data $b_j$ with respect to the classification $c_k$=Σ(the characteristic value contribution rate*MAX($N_{ck}$,1−$N_{ck}$))/N.

In this embodiment, the data filtering module 300 includes:

a first filtering unit configured to retain one of the characteristic data with the characteristic contribution rate of 1 and remove the remaining characteristic data with the characteristic contribution rate of 1, in response to the number of characteristics data with the characteristic contribution rate of 1 in the unbalanced sample data is greater than or equal to 2.

In this embodiment, the data filtering module 300 further includes:

a second filtering unit t configured to remove the sample data in the unbalanced sample data with a plurality of samples having the characteristic value contribution rate of less than or equal to 0.5.

In this embodiment, the apparatus also includes:

a model training module configured to train a to-be-trained model created based on the optimized classification algorithm using historical unbalanced sample data.

In this embodiment, the model training module includes:

a relationship establishing unit configured to obtain the sample data for establishing a correspondence between the historical unbalanced sample data and the sample classification result; and a model establishing unit configured to analyzing an influence of the characteristic data and the sample data on the sample classification results based on the characteristic data and the sample data in the historical unbalanced sample data, and determining a model structure and one or more model parameters of the sample classification model according to the influence.

In this embodiment, each of the above-mentioned modules/units is implemented in the form of software, which can be computer program(s) stored in a memory of the unbalanced sample classification apparatus and include instructions executable on a processor of the unbalanced sample classification apparatus. In other embodiments, each of the above-mentioned modules/units may be implemented in the form of hardware (e.g., a circuit of the unbalanced sample classification apparatus which is coupled to the processor of the unbalanced sample classification apparatus) or a combination of hardware and software (e.g., a circuit with a single chip microcomputer). As for the device (apparatus) embodiments, since they are basically similar to the method embodiments, their descriptions are relatively simple. For related parts, refer to the descriptions of the method embodiments.

Each embodiment in the present disclosure is described in a progressive manner, and each embodiment focuses on the differences from other embodiments, hence the same or similar parts between the embodiments can be referred to each other.

The present disclosure provides an electronic device, which includes a processor, a storage, and a computer program stored in the storage and being executable on the processor. When the computer program is executed by the processor, the steps of the above-mentioned unbalanced sample classification method are implemented.

The present disclosure provides a computer-readable storage medium. The computer-readable storage medium stores a computer program, and when the computer program is executed by a processor, the steps of the above-mentioned unbalanced sample classification method are implemented.

Figure 4:
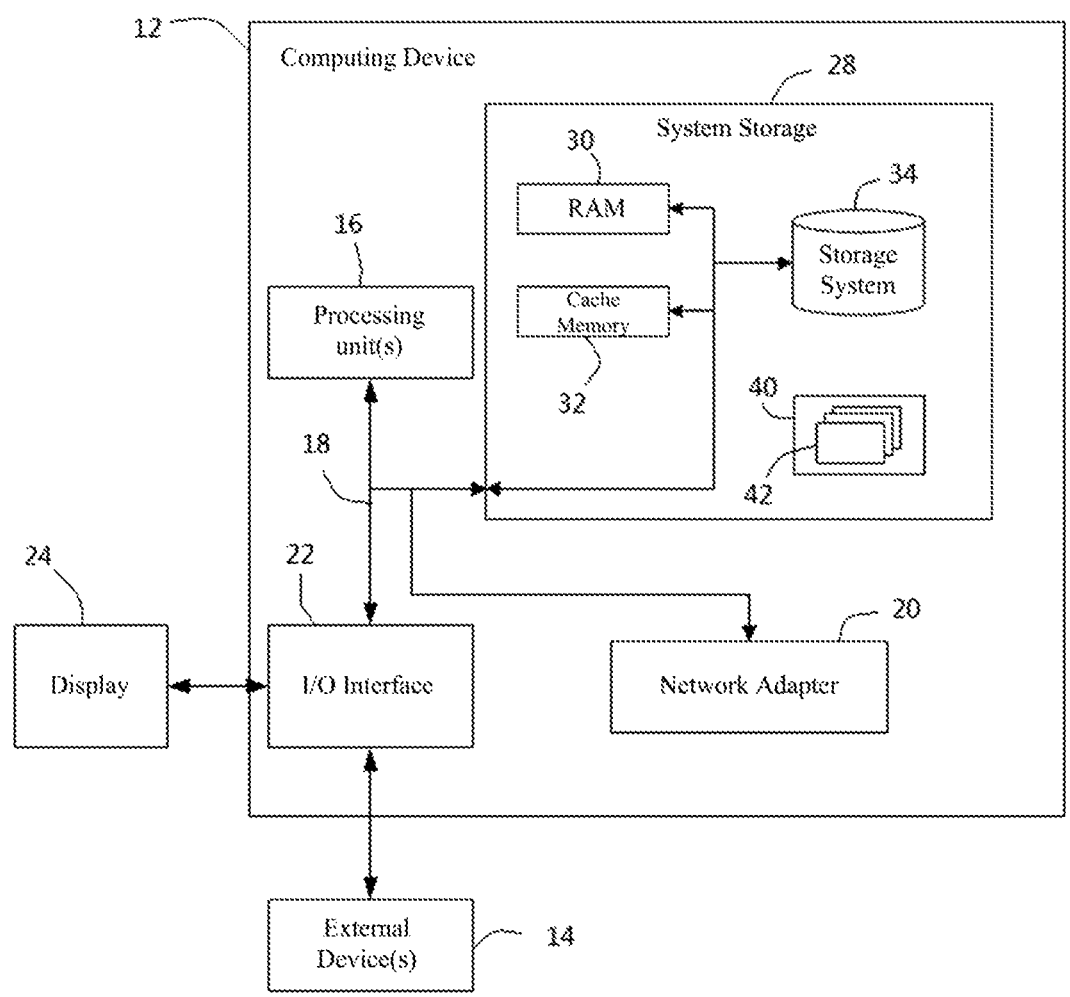
FIG. 4 is a schematic block diagram of the structure of an embodiment of a computing device according to the present disclosure.

FIG. 4 is a schematic block diagram of the structure of an embodiment of a computing device according to the present disclosure. In this embodiment, a computing device 12 is provided. In one embodiment, the computing device 12 may include the unbalanced sample classification apparatus shown in FIG. 3 or be the unbalanced sample classification apparatus itself.

As shown in FIG. 4, the above-mentioned computing device 12 is in the form of a general-purpose computing device. The computing device 12 may include, but are not limited to one or more processors or processing units 16, a system storage 28, and a bus 18 connecting different system components (including the system storage 28 and the one or more processing units 16).

The bus 18 may include a memory bus or a memory controller, a peripheral bus, a graphics acceleration port or processor, or a local bus using one or more bus structures. The bus 18 may include one or more types of bus with different structures, for example, industry standard architecture (ISA) bus, microchannel architecture (MAC) bus, enhanced ISA bus, audio and video electronics standards association (VESA) local bus, and peripheral component interconnect (PCI) bus.

The computing device 12 typically includes a variety of computer system readable media. These media can be any media that can be accessed by the computing device 12, including volatile and non-volatile media as well as removable and non-removable media.

The system storage 28 may include a computer system readable medium in the form of volatile memory such as random access memory (RAM) 30 and/or cache memory 32. The computing device 12 may further include other removable/non-removable and volatile/nonvolatile computer system storage media. As an example, the storage system 34 may be used to read and write non-removable, non-volatile magnetic media (generally referred to as hard drive). Although not shown in FIG. 4, a disk drive for reading and writing removable non-volatile disks (e.g., floppy disks) and an optical drive for reading and writing removable non-volatile optical disks (for example, CD-ROMs, DVD-ROMs, or other optical media) can be provided. In these cases, each drive can be connected to the bus 18 through one or more data medium interfaces. The system storage 28 may include at least one program product, and the program product has a set (e.g., at least one) of program modules 42 configured to perform the functions of the embodiments of the present disclosure.

A program/utility tool 40 have a set (at least one) of program module 42 which may be stored in, for example, a memory. The program module 42 can include, but is not limited to, an operating system, one or more application programs, and other program modules and program data, and each or some combinations of these examples may include the implementation of a network environment. The program module 42 generally executes the functions and/or methods in the embodiments described in the present disclosure.

The computing device 12 may also communicate with one or more external devices 14 (e.g., keyboards, pointing devices, a display 24, and cameras), and may also communicate with one or more devices that enable users to interact with the computing device 12, and/or communicate with any device (e.g., a network card and a modem) that enables the computing device 12 to communicate with one or more other computing devices. This communication can be performed through an input/output (I/O) interface 22. In addition, the computing device 12 may also communicate with one or more networks (for example, a local area network (LAN)), a wide area network (WAN), and/or a public network (e.g., the Internet) through a network adapter 20. As shown in FIG. 4, the network adapter 20 communicates with other modules of the computing device 12 through the bus 18. It should be understood that, although not shown in FIG. 4, other hardware and/or software modules including, but not limited to microcode, a device driver, a redundant processing unit 16, an external disk drive array, a RAID system, a tape drive, and a data backup storage system 34 can be used in conjunction with the computing device 12.

The processing unit 16 executes the programs stored in the system storage 28 so as to execute various functional applications and data processing such as implementing the above-mentioned logistics route prediction method provided by the embodiments of the present disclosure.

That is, when the above-mentioned processing unit 16 executes the above-mentioned program, it realizes: obtaining unbalanced sample data, where the unbalanced sample data includes sample data and characteristic data; calculating a sample contribution rate based on the sample data and the characteristic data; filtering out a part of the sample data within a preset sample contribution threshold according to the sample contribution rate to determine as target sample data; and inputting the target sample data into a sample classification model to calculate a sample classification result through an optimized classification algorithm.

In one embodiment, the present disclosure also provides a computer-readable storage medium stored with computer program(s), and when the program(s) are executed by a processor, the above-mentioned logistics route prediction method provided by the embodiments of the present disclosure is implemented.

That is, when the program is executed by the processor, it realizes: obtaining unbalanced sample data, where the unbalanced sample data includes sample data and characteristic data; calculating a sample contribution rate based on the sample data and the characteristic data; filtering out a part of the sample data within a preset sample contribution threshold according to the sample contribution rate to determine as target sample data; and inputting the target sample data into a sample classification model to calculate a sample classification result through an optimized classification algorithm.

Any combination of one or more computer-readable media may be used. The computer-readable medium may be a computer-readable signal medium or a computer-readable storage medium. The computer-readable storage medium may be, but not limited to, an electrical, magnetic, optical, electromagnetic, infrared, or semiconductor system, device, or component, or any combination of the above. As an example, the computer-readable storage media include: an electrical connection with one or more wires, a portable computer disk, a hard disk, a random access memory (RAM), a read-only memory (ROM), an erasable programmable read-only memory (EPOM), a flash, an optical fiber, a portable compact disk read-only memory (CD-ROM), an optical storage device, a magnetic storage device, or any suitable combination of the above. In the present disclosure, the computer-readable storage medium can be any tangible medium that contains or stores programs, and the programs can be used by or in combination with an instruction execution system, device, or component.

The computer-readable signal medium may include a data signal propagated in a baseband or as a part of a carrier wave, where computer-readable program codes are carried therein. The propagated data signal can use many forms including, but not limited to electromagnetic signals, optical signals, or any suitable combination of the foregoing. The computer-readable signal medium may also be any computer-readable medium other than the computer-readable storage medium. The computer-readable medium may send, propagate or transmit the program for use by or in combination with an instruction execution system, apparatus, or component.

The computer program codes for performing the operations of the present disclosure can be composed in one or more programming languages or a combination thereof. The above-mentioned programming languages may include object-oriented programming languages such as Java, Smalltalk, C++, and also include conventional procedural programming language such as C programming language or similar programming language. The program code can be executed entirely on the computer of a user, partly on the computer of the user, executed as an independent software package, executed partly on the computer of the use and partly on a remote computer, or entirely executed on the remote computer or server. In the case involving a remote computer, the remote computer can be connected to the computer of the user through any kind of network including a LAN or a WAN, or can be connected to an external computer (for example, connecting via the Internet provided by an Internet service provider). Each embodiment in the present disclosure is described in a progressive manner, and each embodiment focuses on the differences from other embodiments, hence the same or similar parts between the embodiments can be referred to each other.

Although the preferred embodiments of the present disclosure have been described, those skilled in the art can make additional changes and modifications to these embodiments without creative efforts once they learn of the basic creative concepts. Therefore, the appended claims are intended to be interpreted as including the preferred embodiments and all changes and modifications within the scope of the embodiments of the present disclosure.

Finally, it should be noted that in the present disclosure, the relational terms such as first and second are only used to distinguish one entity or operation from another entity or operation, and do not necessarily require or imply that there is any such actual relationship or order between these entities or operations. Moreover, the terms "include", "comprise" or any other variants thereof are intended to cover non-exclusive inclusion, so that a process, method, object or terminal device including a series of elements not only includes those elements, but also includes other elements that are not explicitly listed, or also include elements inherent to the process, method, object or terminal device. If there are no more restrictions, an element defined by the sentence "including a(n) . . . " does not exclude the existence of other same elements in the process, method, object or terminal device including the element.

The unbalanced sample classification method and the unbalanced sample classification apparatus provided by the present disclosure are described in detail above. Embodiments are used in the present disclosure to illustrate the principle and implementation of the present disclosure. The descriptions of the forgoing embodiment are only used to help understand the technical schemes of the present disclosure and their core ideas. At the same time, for those skilled in the art, according to the ideas of the present disclosure, there will be changes in the specific implementation and the application scope. In summary, the contents of the present disclosure should not be construed as limitations to the present disclosure.

What is claimed is:

1. A computer-implemented unbalanced sample classification method, comprising steps of:
   obtaining unbalanced sample data of a to-be-classified object from a classification system, wherein the unbalanced sample data comprises sample data and characteristic data;
   calculating a sample contribution rate based on the sample data and the characteristic data; wherein the sample contribution rate comprises a characteristic value contribution rate calculated based on the sample data $a_i$ and the characteristic data $b_j$; wherein the characteristic value contribution rate of the value corresponding to the characteristic j in the i-th sample $a_{ij}$ with respect to a classification of the samples in the unbalanced sample data $c_k$=max($N_{ck}/N_{jk}$, $(1-N)/N_{jk}$), where k=1, 2, . . . , and T, N is the total number of the samples, i=1, 2, . . . , and N, $N_{ck}$ is the number of the samples with the same values with the characteristic j in the i-th sample $a_{ij}$ in the characteristic data $b_j$ within the classification $c_k$, and $N_{jk}$ is the total number of the samples with the same value with the characteristic j in the i-th sample $a_{ij}$ in the characteristic data $b_j$;
   filtering out a part of the sample data within a preset sample contribution threshold according to the sample contribution rate to determine as target sample data; and
   inputting the target sample data into a sample classification model to calculate a sample classification result through a classification algorithm, and providing the sample classification result to the classification system.

2. The method of claim 1, wherein the sample contribution rate further comprises a characteristic contribution rate, and after the step of calculating the characteristic value contribution rate based on the sample data $a_i$ and the characteristic data $b_j$ further comprises step of:
   calculating the characteristic contribution rate based on the sample data, the characteristic data $b_j$, and the characteristic value contribution rate of the value corresponding to the characteristic j in the i-th sample $a_{ij}$ with respect to the classification $c_k$, wherein the characteristic contribution rate of the characteristic data $b_j$ with respect to the classification $c_k$=Σ(the characteristic value contribution rate*MAX($N_{ck}$, $1-N_{ck}$))/N.

3. The method of claim 2, wherein the step of filtering out the part of the sample data within the preset sample contribution threshold according to the sample contribution rate to determine as the target sample data comprises:
   retaining one of the characteristic data with the characteristic contribution rate of 1 and removing the remaining characteristic data with the characteristic contribution rate of 1, in response to the number of characteristics data with the characteristic contribution rate of 1 in the unbalanced sample data is greater than or equal to 2.

4. The method of claim 3, wherein the step of filtering out the part of the sample data within the preset sample contribution threshold according to the sample contribution rate to determine as the target sample data further comprises:
   removing the sample data with the characteristic value contribution rate of less than or equal to 0.5 in the unbalanced sample data, in response to there being a plurality of the sample data.

5. The method of claim 1, wherein after the step of inputting the target sample data into the sample classification model to calculate the sample classification result through the classification algorithm further comprises step of:
   training a to-be-trained model created based on the classification algorithm using historical unbalanced sample data.

6. The method of claim 5, wherein the step of training the to-be-trained model created based on the classification algorithm using historical unbalanced sample data comprises:
   obtaining the sample data for establishing a correspondence between the historical unbalanced sample data and the sample classification result; and analyzing an influence of the characteristic data and the sample data on the sample classification results based on the characteristic data and the sample data in the historical unbalanced sample data, and determining a model structure and one or more model parameters of the sample classification model according to the influence.

7. An unbalanced sample classification apparatus, comprising:
   a memory; and
   a processor;
   one or more computer programs stored in the memory and executable on the processor;
   wherein, the one or more computer programs comprise:
   instructions for obtaining unbalanced sample data of a to-be-classified object from a classification system, wherein the unbalanced sample data comprises sample data and characteristic data;
   instructions for calculating a sample contribution rate based on the sample data and the characteristic data; wherein the sample contribution rate comprises a characteristic value contribution rate calculated based on the sample data $a_i$ and the characteristic data $b_j$ wherein the characteristic value contribution rate of the value corresponding to the characteristic j in the i-th sample $a_{ij}$ with respect to a classification of the samples in the unbalanced sample data $c_k$=max($N_{ck}/N_{jk}$, $(1-N)/N_{jk}$) where k=1, 2, . . . , and T, N is the total number of the samples, i=1, 2, . . . , and N, $N_{ck}$ is the number of the samples with the same values with the characteristic j in the i-th sample $a_j$ in the characteristic data $b_j$ within the classification $c_k$, and $N_{jk}$ is the total number of the samples with the same value with the characteristic j in the i-th sample $a_{ij}$ in the characteristic data $b_j$;
   instructions for filtering out a part of the sample data within a preset sample contribution threshold according to the sample contribution rate to determine as target sample data; and
   instructions for inputting the target sample data into a sample classification model to calculate a sample classification result through a classification algorithm, and providing the sample classification result to the classification system.

8. The apparatus of claim 7, wherein the sample contribution rate further comprises a characteristic contribution rate, and the one or more computer programs further comprise:
   instructions for calculating the characteristic contribution rate based on the sample data $a_i$, the characteristic data $b_j$, and the characteristic value contribution rate of the value corresponding to the characteristic j in the i-th sample $a_{ij}$ with respect to the classification $c_k$, wherein the characteristic contribution rate of the characteristic data $b_j$ with respect to the classification $c_k$=Σ(the characteristic value contribution rate*MAX($N_{ck}$, $1-N_{ck}$))/N.

9. The apparatus of claim 8, wherein the instructions for filtering out the part of the sample data within the preset sample contribution threshold according to the sample contribution rate to determine as the target sample data comprise:
   instructions for retaining one of the characteristic data with the characteristic contribution rate of 1 and removing the remaining characteristic data with the characteristic contribution rate of 1, in response to the number of characteristics data with the characteristic contribution rate of 1 in the unbalanced sample data is greater than or equal to 2.

10. The apparatus of claim 9, wherein the instructions for filtering out the part of the sample data within the preset sample contribution threshold according to the sample contribution rate to determine as the target sample data further comprise:
   instructions for removing the sample data with the characteristic value contribution rate of less than or equal to 0.5 in the unbalanced sample data, in response to there being a plurality of the sample data.

11. The apparatus of claim 7, wherein the one or more computer programs further comprise:
   instructions for training a to-be-trained model created based on the classification algorithm using historical unbalanced sample data.

12. The apparatus of claim 11 wherein the instructions for training the to-be-trained model created based on the classification algorithm using historical unbalanced sample data comprise:
   instructions for obtaining the sample data for establishing a correspondence between the historical unbalanced sample data and the sample classification result; and
   instructions for analyzing an influence of the characteristic data and the sample data on the sample classification results based on the characteristic data and the sample data in the historical unbalanced sample data, and determining a model structure and one or more model parameters of the sample classification model according to the influence.

* * * * *